United States Patent
Wei et al.

(10) Patent No.: US 12,507,277 B2
(45) Date of Patent: Dec. 23, 2025

(54) MONITORING RANDOM ACCESS RESPONSE

(71) Applicant: HUAWEI TECHNOLOGIES CO., LTD., Guangdong (CN)

(72) Inventors: Dongdong Wei, Shanghai (CN); Fan Wang, Berkshire (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/062,117

(22) Filed: Oct. 2, 2020

(65) Prior Publication Data
US 2021/0022175 A1    Jan. 21, 2021

Related U.S. Application Data

(63) Continuation of application No. PCT/CN2019/081351, filed on Apr. 3, 2019.

(30) Foreign Application Priority Data

Apr. 4, 2018   (CN) .......................... 201810302318.3

(51) Int. Cl.
*H04W 74/00* (2009.01)
*H04W 72/0446* (2023.01)
(Continued)

(52) U.S. Cl.
CPC ..... *H04W 74/006* (2013.01); *H04W 72/0446* (2013.01); *H04W 74/0833* (2013.01); *H04W 74/0838* (2024.01)

(58) Field of Classification Search
CPC ........... H04W 74/006; H04W 72/0446; H04W 74/0833; H04W 56/0045; H04W 84/06;
(Continued)

(56) References Cited

U.S. PATENT DOCUMENTS 9,854,609 B2 * 12/2017 Yang ................. H04W 74/0833
2014/0086176 A1 *  3/2014 Liu ..................... H04W 74/006
                                                          370/252
(Continued)

FOREIGN PATENT DOCUMENTS

CN    103535109 A    1/2014
CN    103718636 A    4/2014
(Continued)

OTHER PUBLICATIONS

Ericsson, "Random Access in NR", 3GPP TSG-RAN WG2 #98, Tdoc R2-1704403, Hangzhou, PR China, May 15-19, 2017, 5 pages.
(Continued)

*Primary Examiner* — Thinh D Tran
(74) *Attorney, Agent, or Firm* — Fish & Richardson P.C.

(57) ABSTRACT

A communications method and apparatus are provided. The method includes: receiving, by a terminal device, a first message from a network device, where the first message includes first offset information, or the first message includes second offset information, or the first message includes the first offset information and the second offset information; the first offset information is used to indicate a time offset value of a random access response RAR monitoring window for monitoring a RAR; and the second offset information is used to indicate a time offset value for sending a second message, and the second message is a message sent by the terminal device based on the RAR; and randomly accessing, by the terminal device, the network device based on the first message.

13 Claims, 9 Drawing Sheets

(51) Int. Cl.
*H04W 74/0833* (2024.01)
*H04W 74/0838* (2024.01)

(58) Field of Classification Search
CPC .............. H04W 24/08; H04W 74/0838; H04B 7/18513; H04L 5/0048
See application file for complete search history.

(56) References Cited

U.S. PATENT DOCUMENTS

| | | |
|---|---|---|
| 2014/0198716 A1 | 7/2014 | Speight et al. |
| 2014/0241235 A1 | 8/2014 | Speight et al. |
| 2014/0362798 A1 | 12/2014 | Shu et al. |
| 2015/0382205 A1 | 12/2015 | Lee et al. |
| 2016/0198497 A1* | 7/2016 | Yu .................... H04W 72/0446 370/330 |
| 2016/0270038 A1* | 9/2016 | Papasakellariou .... H04L 1/1671 |
| 2016/0353440 A1* | 12/2016 | Lee .................... H04W 74/0833 |
| 2017/0127414 A1* | 5/2017 | Yi .......................... H04W 72/23 |
| 2017/0290014 A1* | 10/2017 | Kim ...................... H04W 48/12 |
| 2018/0035470 A1* | 2/2018 | Chen ................. H04W 74/0833 |
| 2019/0215864 A1* | 7/2019 | Yang .................... H04W 80/02 |
| 2020/0178312 A1* | 6/2020 | Jiang ................. H04W 74/0833 |
| 2020/0367290 A1* | 11/2020 | Mazloum ............ H04W 74/004 |

FOREIGN PATENT DOCUMENTS

| | | |
|---|---|---|
| CN | 103929826 A | 7/2014 |
| CN | 104854948 A | 8/2015 |
| CN | 105191199 A | 12/2015 |
| CN | 105379336 A | 3/2016 |
| CN | 107231217 A | 10/2017 |
| CN | 107306452 A | 10/2017 |
| CN | 107371273 A | 11/2017 |
| CN | 107409416 A | 11/2017 |
| CN | 107567693 A | 1/2018 |
| EP | 2553986 A1 | 2/2013 |
| WO | 2014154246 A1 | 10/2014 |
| WO | 2017193341 A1 | 11/2017 |

OTHER PUBLICATIONS

Extended European Search Report issued in European Application No. 197819003.6 on Apr. 7, 2021, 13 pages.

Dish Network, Thales, Fraunhofer IIS, SES S.A., "Satellite Aspects-Forward Compatibility Consideration for Random Access reamble Format," 3GPP TSG RAN WG1 Meeting NR AH, R1-1700700, ,Spokane, WA, Jan. 16-20, 2017, 5 pages.

PCT International Search Report and Written Opinion issued in International Application No. PCT/CN2019/081351 on Jun. 28, 2019, 14 pages (with English translation).

Anonymous, "Draft Agenda," 3GPP TSG RAN WG1 Meeting #57, R1-091670, San Francisco, USA, May 4-8, 2009, 2 pages.

Hwang et al., "Random Access Method with Access Time Distribution Scheme," 2015 International Conference on Information and Communication Technology Convergence (ICTC), Oct. 2015, 3 pages.

Lin Mu, "The Research of Random Access Procedure in LTE System," Master's Dissertation, Tianjin University, Nov. 2015, 56 pages (with English abstract).

Office Action issued in Chinese Application No. 201810302318.3 on Sep. 3, 2021, 7 pages (with English translation).

Office Action issued in Chinese Application No. 201810302318.3 on Nov. 17, 2020, 10 pages.

* cited by examiner

MONITORING RANDOM ACCESS RESPONSE

CROSS-REFERENCE TO RELATED APPLICATIONS

This application is a continuation of International Application No. PCT/CN2019/081351, filed on Apr. 3, 2019, which claims priority to Chinese Patent Application No. 201810302318.3, filed on Apr. 4, 2018. The disclosures of the aforementioned applications are hereby incorporated by reference in their entireties.

TECHNICAL FIELD

This application relates to the field of communications technologies, and in particular, to a communications method and apparatus.

BACKGROUND

In a mobile communications system such as a long term evolution (LTE) system or a new radio (NR) system, a terminal device needs to access the mobile communications system through a random access (RA) process. The terminal device sends a random access preamble to initiate the random access process, and receives a random access response (RAR) in a RAR monitoring window after sending the preamble. The RAR is scrambled by using a random access radio network temporary identifier (RA-RNTI) corresponding to the terminal device.

With further research on the mobile communications system by the 3rd generation partnership project (3GPP), the mobile communications system may not only include a terrestrial cellular system, but also extend wireless signal coverage through a satellite, thereby implementing convergence of terrestrial cellular communications and satellite communications over an air interface. Compared with the terrestrial cellular system, the satellite has a height of hundreds of kilometers to tens of thousands of kilometers, and a unidirectional transmission delay of sending a satellite signal to the terrestrial cellular system is between several milliseconds and more than 100 milliseconds. In this long-distance transmission and high delay scenario, because there is a relatively high transmission delay, in the random access process, after sending the preamble, the terminal device cannot receive a RAR with a relatively high delay in the RAR monitoring window, causing a random access failure. Therefore, in the long-distance transmission and high delay scenario, there is no clear solution of how the terminal device accesses the mobile communications system.

SUMMARY

Embodiments of this application provide a communications method and apparatus, to resolve a problem of how a terminal device accesses a network in a long transmission and high delay scenario.

According to a first aspect, an embodiment of this application provides a communication method, including:
receiving, by a terminal device, a first message from a network device, where the first message includes first offset information, or the first message includes second offset information, or the first message includes the first offset information and the second offset information; and randomly accessing, by the terminal device, the network device based on the first message, where the first offset information is used to indicate a time offset value of a random access response RAR monitoring window for monitoring a RAR; and the second offset information is used to indicate a time offset value for sending a second message, and the second message is a message sent by the terminal device based on the RAR.

According to the method provided in this embodiment of this application, when the first message includes the first offset information, and when the terminal device monitors the RAR, the terminal device determines a start time of the RAR monitoring window based on the time offset value indicated by the first offset information, so that the terminal device can monitor, in the offset RAR monitoring window, the RAR sent by the network device, and an opportunity that the terminal device successfully receives the RAR is improved. In this way, the terminal device can access the network device through a random access process in a long-distance transmission and high delay scenario.

When the first message includes the second offset information, the terminal device determines, by using the second offset information, a time of sending the second message, to resolve a problem that in the long-distance transmission and high delay scenario, because of a timing advance mechanism, a time of receiving the RAR by the terminal device is later than the determined time of sending the second message, so that the timing advance mechanism can be applied to the long-distance transmission and high delay scenario, thereby improving system compatibility.

In an optional implementation, the first offset information and the second offset information correspond to a same indicator bit in the first message.

In the foregoing method, the first offset information and the second offset information correspond to the same indicator bit in the first message, and one indicator bit may be used to indicate two pieces of offset information, thereby reducing resource overheads of the first message, and improving system resource utilization.

In an optional implementation, the first message further includes third offset information, and the third offset information is used to indicate a time offset value for sending a feedback message of downlink data by the terminal device.

A time of sending the feedback message is adjusted by using the third offset information, to resolve a problem that in the long-distance transmission and high delay scenario, because of the timing advance mechanism, a time of receiving the downlink data by the terminal device is later than the determined time of sending the feedback message, so that the timing advance mechanism can be applied to the long-distance transmission and high delay scenario, thereby improving the system compatibility.

In an optional implementation, the first message further includes fourth offset information, and the fourth offset information is used to indicate a time offset value for sending uplink data.

A time of sending the uplink data is adjusted by using the fourth offset information, to resolve a problem that in the long-distance transmission and high delay scenario, because of the timing advance mechanism, a time of receiving, by the terminal device, indication information for indicating a resource for sending the uplink data is later than the determined time of sending the uplink data, so that the timing advance mechanism can be applied to the long-distance transmission and high delay scenario, thereby improving the system compatibility.

In an optional implementation, the third offset information and the fourth offset information correspond to a same indicator bit in the first message.

In the foregoing method, one indicator bit is used to indicate two pieces of offset information, thereby reducing the resource overheads of the first message, and improving the system resource utilization.

According to a second aspect, an embodiment of this application provides a terminal device. The terminal device includes a memory, a transceiver, and a processor. The memory is configured to store an instruction. The processor is configured to execute the instruction stored in the memory, to control the transceiver to receive and send a signal. When the processor executes the instruction stored in the memory, the terminal device is configured to perform the method according to any one of the first aspect or the possible designs of the first aspect.

According to a third aspect, an embodiment of this application provides a terminal device, configured to implement the method according to any one of the first aspect or the possible designs of the first aspect. The terminal device includes corresponding function modules, such as a processing unit, a receiving unit, and a sending unit, that are separately configured to implement the steps in the foregoing method.

According to a fourth aspect, an embodiment of this application provides a computer-readable storage medium. The computer storage medium stores a computer-readable instruction. When a computer reads and executes the computer-readable instruction, the computer is enabled to perform the method according to any one of the first aspect or the possible designs of the first aspect.

According to a fifth aspect, an embodiment of this application provides a computer program product. When a computer reads and executes the computer program product, the computer is enabled to perform the method according to any one of the first aspect or the possible designs of the first aspect.

According to a sixth aspect, an embodiment of this application provides a chip. The chip is connected to a memory, and is configured to read and execute a software program stored in the memory, to implement the method according to any one of the first aspect or the possible designs of the first aspect.

According to a seventh aspect, an embodiment of this application provides a communication method, including:
   determining, by a network device, a first message, where the first message includes first offset information, or the first message includes second offset information, or the first message includes the first offset information and the second offset information; and sending, by the network device, the first message, where the first offset information is used to indicate a time offset value of a random access response RAR monitoring window for monitoring a RAR; and the second offset information is used to indicate a time offset value for sending a second message, and the second message is a message sent by a terminal device based on the RAR.

According to the method provided in this embodiment of this application, when the first message includes the first offset information, the network device indicates the time offset value of the RAR monitoring window by using the first offset information. When the terminal device monitors the RAR, the terminal device determines a start time of the RAR monitoring window based on the time offset value indicated by the first offset information, so that the terminal device can monitor, in the offset RAR monitoring window, the RAR sent by the network device, and an opportunity that the terminal device successfully receives the RAR is improved. In this way, the terminal device can access the network device through a random access process in a long-distance transmission and high delay scenario.

When the first message includes the second offset information, the network device indicates, by using the second offset information, the time offset value of a time of sending the second message, and the time of sending the second message is adjusted by using the second offset information, to resolve a problem that in the long-distance transmission and high delay scenario, because of a timing advance mechanism, a time of receiving the RAR by the terminal device is later than the determined time of sending the second message, so that the timing advance mechanism can be applied to the long-distance transmission and high delay scenario, thereby improving system compatibility.

In an optional implementation, the first offset information and the second offset information correspond to a same indicator bit in the first message.

In an optional implementation, the first message further includes third offset information, and the third offset information is used to indicate a time offset value for sending a feedback message of downlink data by the terminal device.

In an optional implementation, the first message further includes fourth offset information, and the fourth offset information is used to indicate a time offset value for sending uplink data.

In an optional implementation, the third offset information and the fourth offset information correspond to a same indicator bit in the first message.

In an optional implementation, the method further includes:
   sending, by the network device, a third message to the terminal device, where the third message includes third offset information, or the third message includes fourth offset information, or the third message includes the third offset information and the fourth offset information, where
   the third offset information is used to indicate a time offset value for sending a feedback message of downlink data by the terminal device, and the fourth offset information is used to indicate a time offset value for sending uplink data.

According to an eighth aspect, an embodiment of this application provides a network device. The network device includes a memory, a transceiver, and a processor. The memory is configured to store an instruction. The processor is configured to execute the instruction stored in the memory, to control the transceiver to receive and send a signal. When the processor executes the instruction stored in the memory, the network device is configured to perform the method according to any one of the seventh aspect or the possible designs of the seventh aspect.

According to a ninth aspect, an embodiment of this application provides a network device, configured to implement the method according to any one of the seventh aspect or the possible designs of the seventh aspect. The network device includes corresponding function modules, such as a processing unit, a receiving unit, and a sending unit, that are separately configured to implement the steps in the foregoing method.

According to a tenth aspect, an embodiment of this application provides a computer-readable storage medium. The computer storage medium stores a computer-readable instruction. When a computer reads and executes the computer-readable instruction, the computer is enabled to perform the method according to any one of the seventh aspect or the possible designs of the seventh aspect.

According to an eleventh aspect, an embodiment of this application provides a computer program product. When a computer reads and executes the computer program product, the computer is enabled to perform the method according to any one of the seventh aspect or the possible designs of the seventh aspect.

According to a twelfth aspect, an embodiment of this application provides a chip. The chip is connected to a memory, and is configured to read and execute a software program stored in the memory, to implement the method according to any one of the seventh aspect or the possible designs of the seventh aspect.

According to a thirteenth aspect, an embodiment of this application provides a communication method, including:

receiving, by a terminal device, a first message from a network device, where the first message includes first information, or the first message includes second information, or the first message includes the first information and the second information; and randomly accessing, by the terminal device, the network device based on the first message.

The first information is used to indicate a time length of an interval between a random access request sent by the terminal device and a RAR monitoring window for a RAR corresponding to the random access request; and the second information is used to indicate a time length of an interval between the RAR and a second message, where the second message is a message sent by the terminal device based on the RAR.

According to the method provided in this embodiment of this application, when the first message includes the first information, and when the terminal device monitors the RAR, the terminal device determines a time length of an interval between the RAR monitoring window and the RAR based on the time length indicated by the first information, so that the terminal device can monitor, in the RAR monitoring window, the RAR sent by the network device, and an opportunity that the terminal device successfully receives the RAR is improved. In this way, the terminal device can access the network device through a random access process in a long-distance transmission and high delay scenario.

When the first message includes the second information, the terminal device determines, by using the second information, a time of sending the second message, to resolve a problem that in the long-distance transmission and high delay scenario, because of a timing advance mechanism, a time of receiving the RAR by the terminal device is later than the determined time of sending the second message, so that the timing advance mechanism can be applied to the long-distance transmission and high delay scenario, thereby improving system compatibility.

In an optional implementation, the first information and the second information correspond to a same indicator bit in the first message.

In an optional implementation, the first message further includes third information, and the third information is used to indicate a time length of an interval between downlink data and a feedback message sent based on the downlink data.

In an optional implementation, the first message further includes fourth information, and the fourth information is used to indicate a time length of an interval between resource scheduling indication information and uplink data sent on a resource indicated by the resource scheduling indication information.

In an optional implementation, the third information and the fourth information correspond to a same indicator bit in the first message.

According to a fourteenth aspect, an embodiment of this application provides an access network node. The access network node includes a memory, a transceiver, and a processor. The memory is configured to store an instruction. The processor is configured to execute the instruction stored in the memory, to control the transceiver to receive and send a signal. When the processor executes the instruction stored in the memory, a terminal is configured to perform the method according to any one of the thirteenth aspect or the possible designs of the thirteenth aspect.

According to a fifteenth aspect, an embodiment of this application provides an access network node, configured to implement the method according to any one of the thirteenth aspect or the possible designs of the thirteenth aspect. The access network node includes corresponding function modules, such as a processing unit, a receiving unit, and a sending unit, that are separately configured to implement the steps in the foregoing method.

According to a sixteenth aspect, an embodiment of this application provides a computer-readable storage medium. The computer storage medium stores a computer-readable instruction. When a computer reads and executes the computer-readable instruction, the computer is enabled to perform the method according to any one of the thirteenth aspect or the possible designs of the thirteenth aspect.

According to a seventeenth aspect, an embodiment of this application provides a computer program product. When a computer reads and executes the computer program product, the computer is enabled to perform the method according to any one of the thirteenth aspect or the possible designs of the thirteenth aspect.

According to an eighteenth aspect, an embodiment of this application provides a chip. The chip is connected to a memory, and is configured to read and execute a software program stored in the memory, to implement the method according to any one of the thirteenth aspect or the possible designs of the thirteenth aspect.

According to a nineteenth aspect, an embodiment of this application provides a communication method, including:

determining, by a network device, a first message, where the first message includes first information, or the first message includes second information, or the first message includes the first information and the second information; and sending, by the network device, the first message.

The first information is used to indicate a time length of an interval between a random access request sent by a terminal device and a RAR monitoring window for a RAR corresponding to the random access request; and the second information is used to indicate a time length of an interval between the RAR and a second message, where the second message is a message sent by the terminal device based on the RAR.

According to the method provided in this embodiment of this application, when the first message includes the first information, the network device indicates a time length of an interval between the RAR monitoring window and the RAR by using the first information. When the terminal device monitors the RAR, the terminal device determines a start time of the RAR monitoring window based on the time length indicated by the first information, so that the terminal device can monitor, in the offset RAR monitoring window, the RAR sent by the network device, and an opportunity that the terminal device successfully receives the RAR is improved. In this way, the terminal device can access the network device through a random access process in a long-distance transmission and high delay scenario.

When the first message includes the second information, the network device indicates, by using the second information, a time length of an interval between a time of sending the second message and the RAR, and the time of sending the second message is adjusted by using the second information, to resolve a problem that in the long-distance transmission and high delay scenario, because of a timing advance mechanism, a time of receiving the RAR by the terminal device is later than the determined time of sending the second message, so that the timing advance mechanism can be applied to the long-distance transmission and high delay scenario, thereby improving system compatibility.

In an optional implementation, the first information and the second information correspond to a same indicator bit in the first message.

In an optional implementation, the first message further includes third information, and the third information is used to indicate a time length of an interval between downlink data and a feedback message sent based on the downlink data.

In an optional implementation, the first message further includes fourth information, and the fourth information is used to indicate a time length of an interval between resource scheduling indication information and uplink data sent on a resource indicated by the resource scheduling indication information.

In an optional implementation, the third information and the fourth information correspond to a same indicator bit in the first message.

In an optional implementation, the method further includes:
  sending, by the network device, a third message to the terminal device, where the third message includes third information, or the third message includes fourth information, or the third message includes the third information and the fourth information, where
  the third information is used to indicate a time length of an interval between downlink data and a feedback message sent based on the downlink data, and the fourth information is used to indicate a time length of an interval between resource scheduling indication information and uplink data sent on a resource indicated by the resource scheduling indication information.

According to a twentieth aspect, an embodiment of this application provides a network device. The network device includes a memory, a transceiver, and a processor. The memory is configured to store an instruction. The processor is configured to execute the instruction stored in the memory, to control the transceiver to receive and send a signal. When the processor executes the instruction stored in the memory, the network device is configured to perform the method according to any one of the nineteenth aspect or the possible designs of the nineteenth aspect.

According to a twenty-first aspect, an embodiment of this application provides a network device, configured to implement the method according to any one of the nineteenth aspect or the possible designs of the nineteenth aspect. The network device includes corresponding function modules, such as a processing unit, a receiving unit, and a sending unit, that are separately configured to implement the steps in the foregoing method.

According to a twenty-second aspect, an embodiment of this application provides a computer-readable storage medium. The computer storage medium stores a computer-readable instruction. When a computer reads and executes the computer-readable instruction, the computer is enabled to perform the method according to any one of the nineteenth aspect or the possible designs of the nineteenth aspect.

According to a twenty-third aspect, an embodiment of this application provides a computer program product. When a computer reads and executes the computer program product, the computer is enabled to perform the method according to any one of the nineteenth aspect or the possible designs of the nineteenth aspect.

According to a twenty-fourth aspect, an embodiment of this application provides a chip. The chip is connected to a memory, and is configured to read and execute a software program stored in the memory, to implement the method according to any one of the nineteenth aspect or the possible designs of the nineteenth aspect.

DESCRIPTION OF EMBODIMENTS

The following describes the embodiments of this application in detail with reference to the accompanying drawings of this specification.

The embodiments of this application may be applied to mobile communications systems in various standards, for example, a new radio (NR) system, a global system for mobile communications (GSM) system, a code division multiple access (CDMA) system, a wideband code division multiple access (WCDMA) system, a general packet radio service (GPRS) system, a long term evolution (LTE) system, a long term evolution-advanced (LTE-A) system, a universal mobile telecommunications system (UMTS), an evolved long term evolution (eLTE) system, and a future communications system. This is not limited herein.

Figure 1:
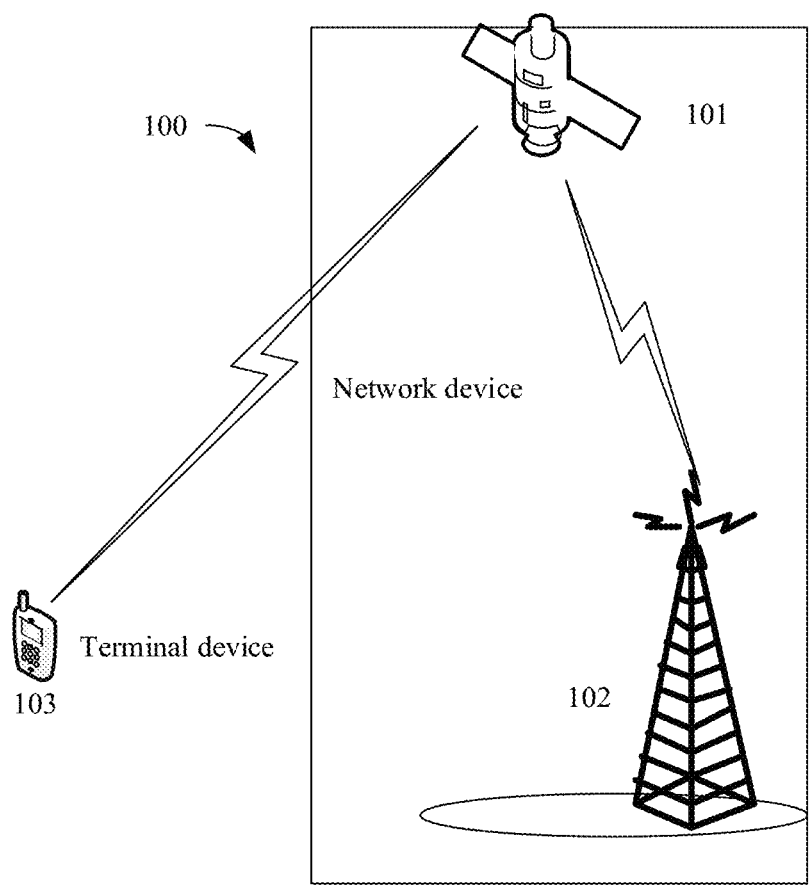
FIG. 1 is a schematic architectural diagram of a mobile communications system according to an embodiment of this application.

FIG. 1 is a schematic architectural diagram of a mobile communications system to which a communication method according to an embodiment of this application is applicable. As shown in FIG. 1, the mobile communications system 100 includes network devices (a satellite 101 and a gateway 102) and a terminal device 103. The terminal device 103 may be connected to the gateway 102 through the satellite 101, and then connected to a core network device in the mobile communications system through the gateway 102, to implement data transmission.

In this embodiment of this application, the gateway 102 may be a radio access device in any standard or a chip disposed in the radio access device, for example, an evolved NodeB (eNB), a radio network controller (RNC), a NodeB (NB), a base station controller (BSC), a base transceiver station (BTS), a home base station (such as a home evolved NodeB or a home NodeB, HNB), a baseband unit (BBU), an access point (AP) in a wireless fidelity (Wi-Fi) system, a wireless relay node, a wireless backhaul node, or a transmission point (TP) or transmission and reception point (TRP); or may be a gNB or TRP or TP in a 5G (NR) system, or one antenna panel or a group of antenna panels (including a plurality of antenna panels) of a base station in a 5G system; or may be a network node, such as a baseband unit (BBU), or a distributed unit (DU) in a DU-CU architecture, that constitutes a gNB or a transmission point.

In this embodiment of this application, the satellite 101 may be an artificial satellite having a satellite-borne processing capability. In this case, some or all of functions of the gateway 102 may be integrated to the satellite 101. Alternatively, the satellite 101 may be a satellite that supports only bent pipe transponding. The bent pipe transponding means that the satellite does not demodulate a signal received from a terrestrial transmitter, but directly forwards the signal to a terrestrial receiver after performing frequency conversion on the signal. Certainly, the terminal device 103 may alternatively directly access the mobile communications system through the gateway 102.

In the embodiments of this application, the terminal device is a device having a wireless transceiver function or a chip that can be disposed in the device. The device having the wireless transceiver function may also be referred to as user equipment (UE), an access terminal, a subscriber unit, a subscriber station, a mobile station, a remote station, a remote terminal, a mobile device, a user terminal, a user agent, or a user apparatus. In an actual application, the terminal device in the embodiments of this application may be a mobile phone, a tablet computer (Pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home or the like. An application scenario is not limited in the embodiments of this application. In this application, the device having the wireless transceiver function and the chip that can be disposed in the device are collectively referred to as the terminal device.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

To implement data transmission between the terminal device and the network device, the terminal device establishes a connection to the network device through a random access process. The random access process includes a schematic diagram of a contention-based random access process shown in FIG. 2A and a schematic diagram of a non-contention-based random access process shown in FIG. 2B.

Figure 2A:
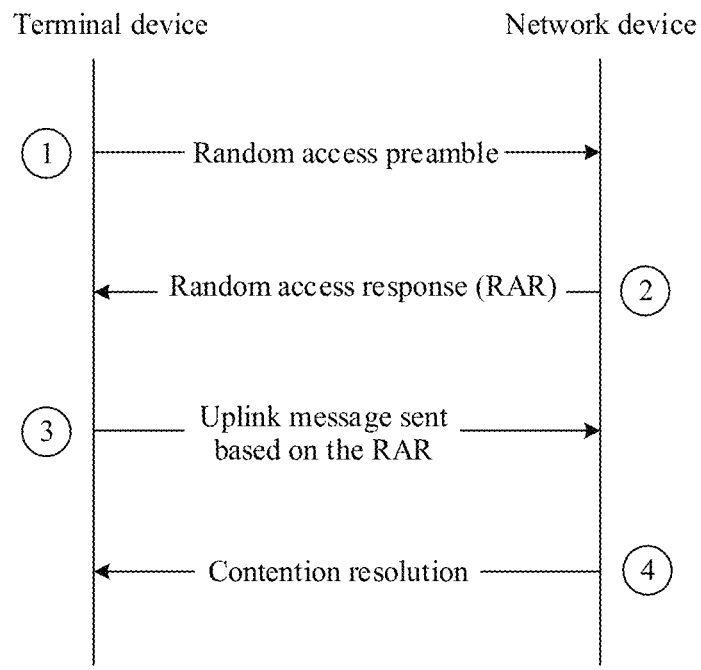
FIG. 2A is a schematic diagram of a contention-based random access process according to an embodiment of this application.

In FIG. 2A, the contention-based random access process mainly includes a four-step message flow:

Message 1: The terminal device sends a random access preamble to the network device, to initiate the random access process.

Specifically, the terminal device randomly selects the random access preamble, and sends the random access preamble on a random access resource corresponding to the random access preamble.

Message 2: The network device sends a random access response to the terminal device.

After successfully detecting the random access preamble, the network device sends the random access response (RAR) corresponding to the random access preamble. The RAR may include an identifier of the random preamble, a timing advance (TA), and resource scheduling indication information, for example, an uplink grant. Correspondingly, the terminal device starts to monitor the RAR in a RAR monitoring window after a first time interval after sending the random access preamble. Optionally, the first time interval is preset in a 3GPP protocol. For example, in an LTE system, a start time of the RAR monitoring window is after the last subframe in which the random access preamble is sent+three subframes (the first time interval). In an NR system, a start time of the RAR monitoring window is after the last symbol on which the random access preamble is sent+a fixed time (the first time interval).

Message 3: The terminal device sends an uplink message to the network device based on the RAR.

If the terminal device successfully receives the RAR in the RAR monitoring window, the terminal device may obtain the TA and an uplink resource indication that are included in the RAR, where the TA is used by the terminal device to perform uplink synchronization.

After performing uplink synchronization by using the TA, the terminal device sends the uplink message after a second time interval on an uplink resource indicated by the resource scheduling indication information. The uplink message may include control signaling or uplink data. The control signaling may be a radio resource control (RRC) message, for example, an RRC connection setup request message or an RRC connection resume request message. Optionally, the second time interval is preset in the 3GPP protocol.

In the LTE system, a time of sending the uplink message is after a subframe in which the RAR is received+four subframes (the second time interval). In the NR system, a time of sending the uplink message is after a time at which the RAR is received+a fixed time (the second time interval).

Message 4: The network device sends a contention resolution message to the terminal device.

The contention resolution message carries an identifier of the terminal device, to complete contention resolution.

Figure 2B:
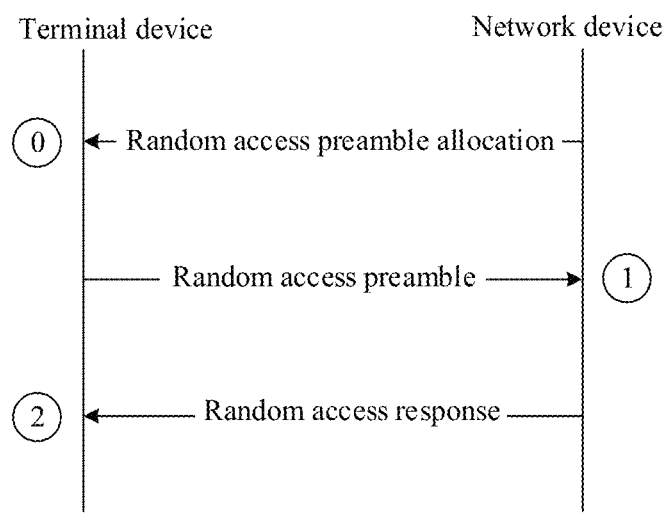
FIG. 2B is a schematic diagram of a non-contention-based random access process according to an embodiment of this application.

In FIG. 2B, the non-contention-based random access process mainly includes a three-step message flow:

Message 0: The network device sends random access preamble allocation information to the terminal device.

The network device determines a random access preamble, and notifies the terminal device of the random access preamble by using the random access preamble allocation information. Because the random access preamble is allocated by the network device, the terminal device does not need to randomly select the random access preamble, to avoid contention with another terminal device.

Message 1: The terminal device sends, to the network device, the random access preamble indicated in the random access preamble allocation information.

Message 2: The network device sends a random access response to the terminal device.

The terminal device receives the random access response after a preset time interval after sending the random access preamble; and sends an uplink message after a preset time interval based on an uplink resource and a TA that are indicated in the random access response, where the uplink message may include control signaling or uplink data.

As analyzed above, in a long-distance transmission and high delay scenario, the terminal device may fail to receive the RAR sent by the network device, causing a failure of the random access process. In view of this, an embodiment of this application provides a communication method for this scenario, to improve a possibility that the terminal device successfully receives the RAR. The method includes the following content.

Step 301: The network device determines a first message, where the first message includes first offset information, or the first message includes second offset information, or the first message includes the first offset information and the second offset information.

The first offset information is used to indicate a time offset value of a RAR monitoring window for monitoring a RAR; and the second offset information is used to indicate a time offset value for sending a second message, and the second message is a message sent by the terminal device based on the RAR.

In the contention-based random access process, the second message is the message 3. In the non-contention-based random access process, the second message is the uplink data or signaling sent by the terminal device based on the RAR.

Step 302: The network device sends the first message.

The network device may send the first message in a broadcast or multicast manner, or may send the first message to the terminal device by using higher layer signaling specific to the terminal device. This is not limited in this embodiment of this application. When the network device sends the first message in the broadcast or multicast manner, the first message may be a remaining minimum system message (RMSI), or may be a system message (SI), or may be a message such as a system information block 1 (SIB 1). A name of the first message is not limited in this embodiment of this application, and examples are not described one by one herein.

Step 303: The terminal device receives the first message from the network device.

Step 304: The terminal device randomly accesses the network device based on the first message.

In this embodiment of this application, the first message may be a message periodically broadcast by the network device in a cell served by the network device. Before sending the random access preamble to the network device, the terminal device may receive the first message from the network device, to randomly access the network device based on the first offset information and/or the second offset information in the first message.

For example, when the first message is the system message, in the contention-based random access process, the terminal device may read the system message sent by the network device, to obtain the first offset information and/or the second offset information; or in the non-contention-based random access process, the terminal device may read the system message to obtain the first offset information and/or the second offset information, or may receive the higher layer signaling (for example, signaling carrying random access preamble allocation information) specific to the terminal device to obtain the first offset information and/or the second offset information.

Optionally, in step 301, the time offset value indicated by the first offset information and the time offset value indicated by the second offset information may be determined based on signal transmission duration between the network device and the terminal device. For example, the time offset value offset1 indicated by the first offset information may satisfy the following formula:

$$\text{offset1} = \alpha \times \alpha \times [T1] \qquad (1)$$

α is a number greater than 0, T1 is the signal transmission duration between the network device and the terminal device, and ⌈ ⌉ represents a rounding-up operation. A value of α may be 1, 2, or the like, and T1 may be a value obtained by dividing a distance between the network device and the terminal device by a speed of light.

Correspondingly, the time offset value offset2 indicated by the second offset information may satisfy the following formula:

$$\text{offset2} = \beta \times [T1] \qquad (2)$$

β is a number greater than 0. A value of β may be 1, 2, or the like.

For example, the distance between the network device and the terminal device is 1600 kilometers. In this case, the signal transmission duration between the network device and the terminal device is 5.28 ms, and the network device may set the time offset value indicated by the first offset information to 6 ms, and set the time offset value indicated by the second offset information to 12 ms.

With reference to the foregoing descriptions, the first offset information indicates the time offset value of the RAR monitoring window for monitoring the RAR by the terminal device. In step 304, the terminal device may determine a start time of the RAR monitoring window based on the first offset information. Specifically, the terminal device may use, as the start time of the RAR monitoring window, a time point whose distance from the last symbol on which the terminal device sends the random access preamble is a sum of a first time interval and the time offset value indicated by the first offset information.

According to the method provided in this embodiment of this application, the network device indicates the time offset value of the RAR monitoring window by using the first offset information. When the terminal device monitors the RAR, the terminal device determines a position of the RAR monitoring window based on the time offset value indicated by the first offset information, so that the terminal device can monitor, in the offset RAR monitoring window, the RAR sent by the network device, and an opportunity that the terminal device successfully receives the RAR is improved. In this way, the terminal device can access the network device through the random access process in the long-distance transmission and high delay scenario.

Figure 4:
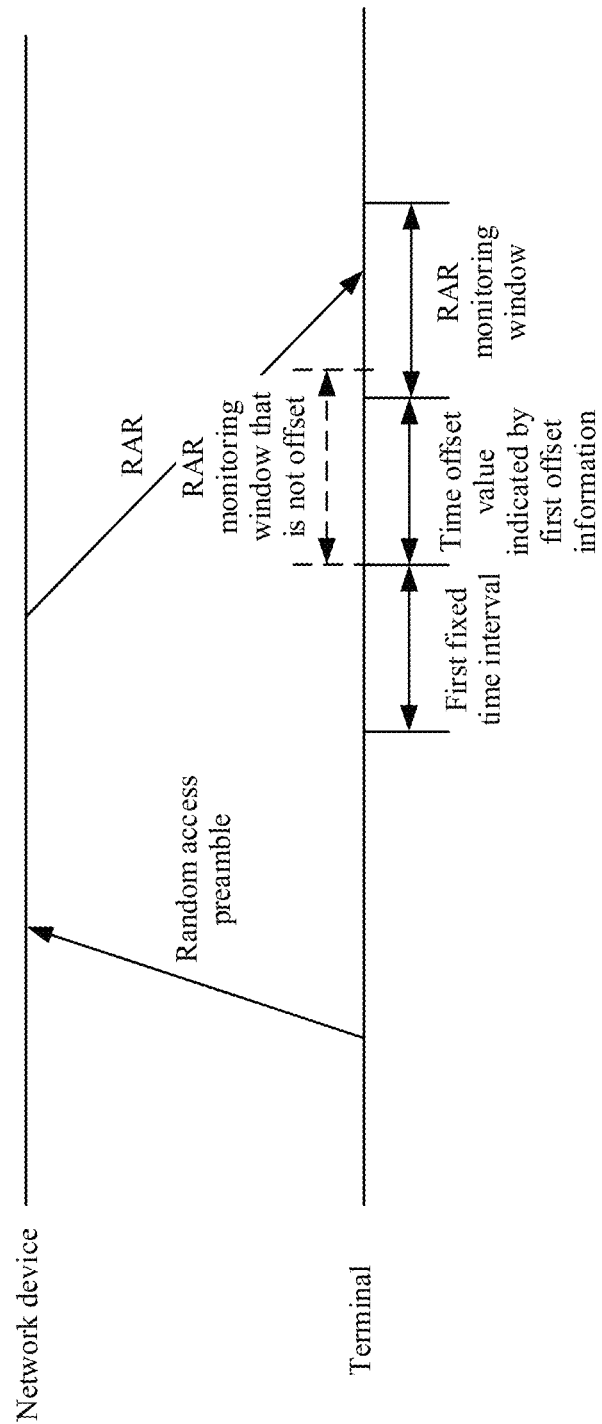
FIG. 4 is a schematic diagram of communication according to an embodiment of this application.

In a possible implementation, FIG. 4 is a schematic diagram of a RAR monitoring window according to an embodiment of this application. Before the RAR monitoring window is offset based on the first offset information, a distance between the start time of the RAR monitoring window and the last symbol on which the terminal device sends the random access preamble is the first time interval. When the distance between the terminal device and the network device is relatively large, a transmission delay of the RAR sent by the network device is relatively high, and the terminal device cannot detect, in the RAR monitoring window that is not offset, the RAR sent by the network device. Through application of the technical solution provided in this embodiment of this application, the distance between the start time of the RAR monitoring window and the last symbol on which the terminal device sends the random access preamble is the sum of the first time interval and the time offset value indicated by the first offset information. The terminal device starts to monitor the RAR at a position whose distance from the last symbol on which the random access preamble is sent is the sum of the first time interval and the time offset value indicated by the first offset information, to reduce a probability that the terminal device cannot detect the RAR in the RAR window due to the relatively high transmission delay of the RAR that is caused by the relatively large distance between the terminal device and the network device.

Further, to ensure synchronization between uplink transmission of different terminal devices from a same transmission time unit, the network device respectively configures TAs for the different terminal devices, and includes the TAs in RARs.

After receiving the RAR, a terminal device may perform uplink transmission (for example, send the second message in this embodiment of this application) based on the TA and an uplink resource indicated in the RAR.

In the long-distance transmission and high delay scenario, for example, in a satellite communication scenario, uplink timing of the terminal device may be hundreds of milliseconds earlier than downlink timing of the terminal device. As a result, a time of receiving the RAR may be later than a time of sending the second message based on the RAR. In this case, the terminal device cannot perform normal uplink transmission.

In view of this, in this embodiment of this application, the network device indicates, by using the second offset information, the time offset value for sending the second message. In step 304, after receiving the RAR sent by the network device, the terminal device may determine, based on the second offset information, the time of sending the second message to the network device, where the second message is a message for the RAR. Optionally, the second message is the message 3 in the four-step random access process. Specifically, the terminal device sends the second message in a transmission time unit that is offset by a second time interval and the time offset value indicated by the second offset information from a transmission time unit in which the RAR is received. The transmission time unit includes but is not limited to a radio frame, a subframe, a slot, a non-slot (also referred to as a mini-slot (mini-slot)), a symbol, or the like. When the transmission time unit is the radio frame, a time length may be 10 ms. When the transmission time unit is a subframe in the LTE system, a time length may be 1 ms. When the transmission time unit is a slot in the LTE system, a time length may be 0.5 ms. When the transmission time unit is a slot in the NR system, the time length may be 1 ms. The non-slot includes at least one symbol, and an average length of each symbol is obtained by dividing a length of one transmission time unit by a quantity of symbols included in the transmission time unit.

According to the method provided in this embodiment of this application, the network device indicates, by using the second offset information, the time offset value of the time of sending the second message. After receiving the RAR, the terminal device determines, based on the time offset value indicated by the second offset information, the time of sending the second message. Further, according to this embodiment of this application, an occurrence probability of a problem that the time of receiving the RAR by the terminal device is later than the determined time of sending the second message in the long-distance transmission and high delay scenario can be reduced.

Figure 5:
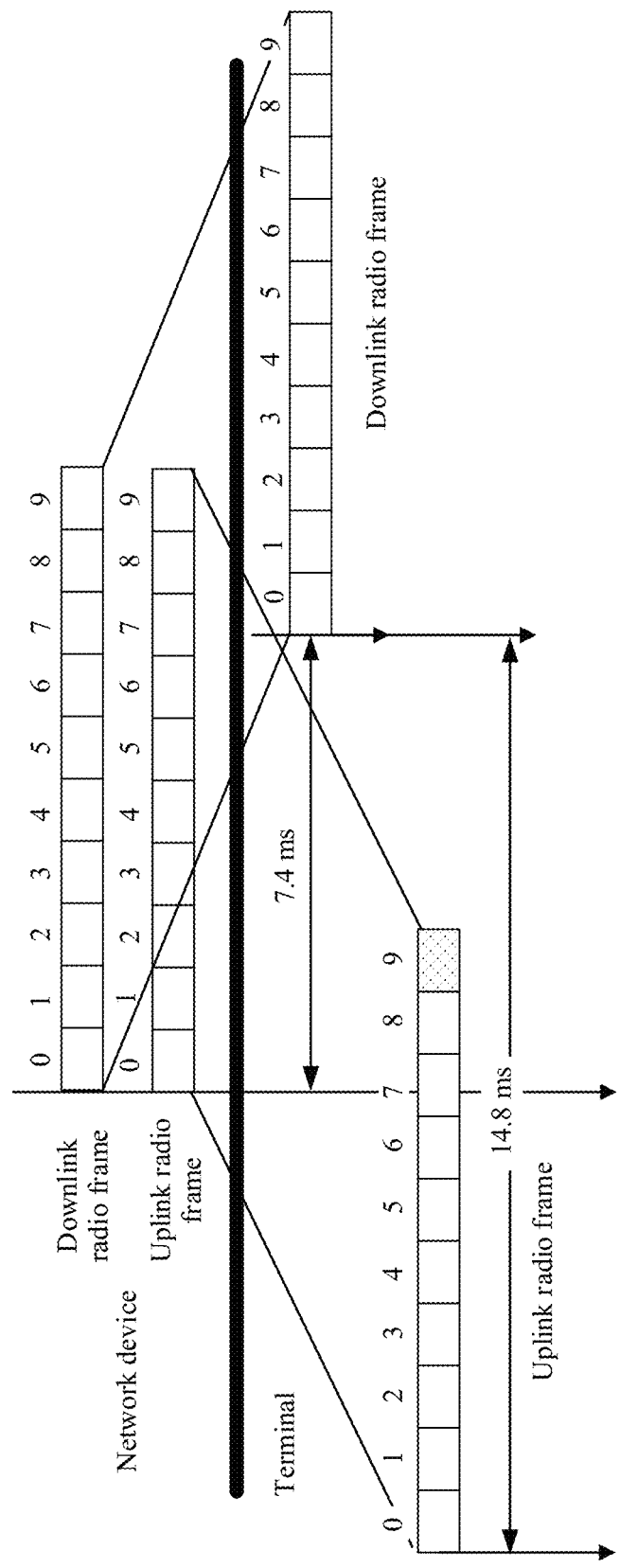
FIG. 5 is a schematic diagram of communication according to an embodiment of this application.

For example, FIG. 5 is a schematic diagram of communication according to an embodiment of this application. In FIG. 5, an example in which the transmission time unit is the subframe in the LTE system is used for description. Other cases are not described in detail.

It is assumed that a transmission delay of data between the network device and the terminal device is 7.4 ms. According to an existing timing advance mechanism, uplink frame timing on the terminal device side is 14.8 ms earlier than downlink frame timing on the terminal device side. It is assumed that the network device sends the RAR in a subframe n in a downlink radio frame and n is equal to 0 in FIG. 5. The terminal device receives the RAR after 7.4 ms. After receiving the RAR, the terminal device needs to send uplink data on a resource indicated by resource scheduling indication information in the RAR. A number of a subframe in which the terminal device sends the uplink data is n+p+m, where n is a subframe number of the subframe including the RAR, p is the second time interval, and m is the time offset value indicated by the second offset information. Using the LTE system as an example, p is 4 ms, and if m is 5 ms, the number of the subframe in which the terminal device sends the uplink data is 9. If there is no second offset information, the number of the subframe in which the terminal device sends the uplink data is 4. It can be learned from FIG. 5 that, because of the timing advance mechanism, in terms of absolute time, a time of sending the uplink data is earlier than a time of receiving the resource scheduling indication information by the terminal device. Therefore, the timing advance mechanism cannot be applied to the long-distance transmission and high delay scenario.

It should be noted that units of the time offset value indicated by the first offset information and the time offset value indicated by the second offset information may be in a plurality of forms, such as a subframe, a slot, a non-slot, and a symbol, and specifically, may be agreed on by the network side in advance, or may be agreed on between the network device and the terminal device. This is not specifically limited herein.

For example, if a number of the last symbol on which the terminal device sends the preamble is n, an interval between the start time of the RAR monitoring window and the last symbol on which the terminal device sends the preamble is m slots, and the time offset value indicated by the first offset information is k transmission time units, the actual start time of the RAR monitoring window for monitoring the RAR by the terminal device is the first transmission time unit after n+m*slot_duration+k*T ms. slot_duration is a slot length, and T is the time length of the transmission time unit.

For another example, in the LTE system, after the terminal device detects the RAR, a start time of sending a message is after a subframe for receiving the RAR+four subframes. If the time offset value indicated by the second offset information is p subframes, an actual start time of sending the message by the terminal device based on the RAR is a $(4+p)^{th}$ subframe after the RAR is received.

In this embodiment of this application, the first offset information and the second offset information may correspond to a same indicator bit in the first message. One indicator bit may include at least one bit, and the at least one bit may be located in one field. In this case, the first offset information and the second offset information are together configured in the first message, and correspond to a same field.

In the foregoing method, the first offset information and the second offset information correspond to the same indicator bit in the first message, and one indicator bit may be used to indicate two pieces of offset information, thereby reducing resource overheads of the first message, and improving system resource utilization.

For example, the first message is RMSI, the first message includes a RaOffset field, values of bits included in the RaOffset field are 113, and the values of the bits included in the RaOffset field are the time offset value indicated by the first offset information and the time offset value indicated by the second offset information. The RaOffset field may be expressed as follows:

```
-- ASN1START
RMSI ::=            SEQUENCE {
    ......              ......
    RaOffset            integer(113)
}
-- ASN1STOP
```

In this embodiment of this application, the first offset information and the second offset information may correspond to different indicator bits in the first message. In this case, the first offset information and the second offset information are independently configured in the first message, and separately correspond to different fields.

In the foregoing method, the first offset information and the second offset information are independently configured in the first message, so that flexibility of configuring the first offset information and the second offset information can be improved, and different values are configured for the first offset information and the second offset information in different scenarios.

For example, the first message is RMSI, the first message includes an offset 1 field and an offset 2 field; values of bits included in the offset 1 field are 113, and the values of the bits included in the offset 1 field are the time offset value indicated by the first offset information; and values of bits included in the offset 2 field are 123, and the values of the bits included in the offset 2 field are the time offset value indicated by the second offset information. The offset 1 field and the offset 2 field may be expressed as follows:

```
- ASN1START
RMSI ::=            SEQUENCE {
    ......              ......
    offset 1            integer(113)
    offset 2            integer(123)
}
-- ASN1STOP
```

Certainly, the foregoing is merely examples, and the first offset information and the second offset information may alternatively be implemented in another manner. Details are not described herein.

After the random access process is completed, the terminal device and the network device establish a control plane connection and a user plane connection. The terminal device may send the uplink data to the network device. The terminal device may receive downlink data from the network device, and send feedback information of the uplink data to the network device.

Optionally, in this embodiment of this application, the first message may further include at least one of third offset information and fourth offset information. The third offset information is used to indicate a time offset value for sending a feedback message of the downlink data by the terminal device, and the fourth offset information is used to indicate a time offset value for sending the uplink data.

After receiving the downlink data sent by the network device, the terminal device may send the feedback message indicating whether the downlink data is correctly received. The feedback message may be a hybrid automatic repeat request (HARQ) feedback. Sending of the feedback message is similar to sending of the second message. After receiving the downlink data sent by the network device, the terminal device may determine, based on the time offset value indicated by the third offset information, a time of sending the feedback message. Specifically, the terminal device may use a sum of a third time interval and the time offset value indicated by the third offset information as an interval between a time of receiving the downlink data sent by the network device and the time of sending the feedback message. Optionally, the third time interval is a time interval preset in a 3GPP protocol. In conclusion, in this embodiment of this application, the third offset information is used to reduce an occurrence probability of a problem that the time of sending the feedback message by the terminal device is earlier than the time of receiving the downlink data by the terminal device.

Correspondingly, after receiving the resource scheduling indication information sent by the network device, the terminal device may determine, based on the fourth offset information, the time of sending the uplink data on the resource indicated by the resource scheduling indication information. The resource scheduling indication information is used to indicate the resource on which the terminal device sends the uplink data. Specifically, the terminal device may use a sum of a fourth time interval and the time offset value indicated by the fourth offset information as an interval between the resource scheduling indication information and the to-be-sent uplink data. Optionally, the fourth time interval is a time interval preset in the 3GPP protocol. In conclusion, in this embodiment of this application, the fourth offset information is used to reduce an occurrence probability of a problem that the time of sending the uplink data by the terminal device is earlier than a time at which the resource for the uplink data is allocated to the terminal device.

It should be noted that units of the time offset value indicated by the third offset information and the time offset value indicated by the fourth offset information may be in a plurality of forms, such as a subframe, a slot, a non-slot, and a symbol, and specifically, may be agreed on by the network side in advance, or may be agreed on between the network device and the terminal device. This is not specifically limited herein.

Optionally, in this embodiment of this application, the third offset information and the fourth offset information may correspond to a same indicator bit in the first message. In this case, the third offset information and the fourth offset information are together configured in the first message, and correspond to a same field, thereby reducing the resource overheads of the first message, and improving the system resource utilization.

Optionally, in this embodiment of this application, the third offset information and the fourth offset information may correspond to different indicator bits in the first message. In this case, the third offset information and the fourth offset information are independently configured in the first message, and respectively correspond to different fields.

Optionally, when the first message includes the first offset information to the fourth offset information, the first offset information to the fourth offset information may alternatively correspond to a same indicator bit. In this case, the first offset information to the fourth offset information are together configured in the first message, and correspond to a same field. According to the foregoing solution, one indicator bit may be used to indicate the first offset information to the fourth offset information, thereby reducing the resource overheads of the first message, and improving the system resource utilization.

Certainly, when the first message includes the first offset information to the fourth offset information, the first offset information to the fourth offset information may alternatively be carried in another manner. For example, when the first message includes the first offset information to the fourth offset information, the first offset information corresponds to one indicator bit in the first message, the second offset information and the fourth offset information correspond to a same indicator bit in the first message, and the third offset information corresponds to another indicator bit. In this case, the first offset information corresponds to one field in the first message, the second offset information and the fourth offset information are together configured in the first message and correspond to a same field, and the third offset information corresponds to another field in the first message.

Certainly, the foregoing is merely examples. When the first message includes the first offset information to the fourth offset information, the first offset information to the fourth offset information may alternatively be implemented in another manner. Details are not described herein.

It should be noted that, in this embodiment of this application, one or more of the third offset information and the fourth offset information may not be sent by using the first message, but may be sent by using a third message. The third message may be a message sent by the network device to the terminal device after the terminal device randomly accesses the network device. The third message may be other system information (OSI), downlink control information (DCI), radio resource control (RRC) signaling, or the like. A sequence of sending the third message and the first message is not limited in this embodiment of this application.

In this embodiment of this application, the third offset information and the fourth offset information may correspond to a same indicator bit in the third message, or may correspond to different indicator bits in the third message. For details, refer to the foregoing descriptions, and the details are not described herein again.

Optionally, in this embodiment of this application, the network device may alternatively configure a plurality of first preset values for the terminal device in RRC signaling, where each first preset value corresponds to one index value. The network device includes, in DCI, an index value of the time offset value indicated by the third offset information, to indicate the time offset value for sending the feedback message of the downlink data by the terminal device.

Similarly, the network device may configure a plurality of second preset values in RRC signaling, where each second preset value corresponds to one index value; and include, in DCI, an index value of the time offset value indicated by the fourth offset information, to indicate the time offset value for the uplink data sent by the terminal device according to the resource scheduling indication information.

Optionally, in this embodiment of this application, the network device may alternatively configure a plurality of third preset values for the terminal device in RRC signaling, where each third preset value corresponds to one index value; include, in DCI, an index value of the time offset value indicated by the third offset information; and include, in DCI, an index value of the time offset value indicated by the fourth offset information.

Figure 6:
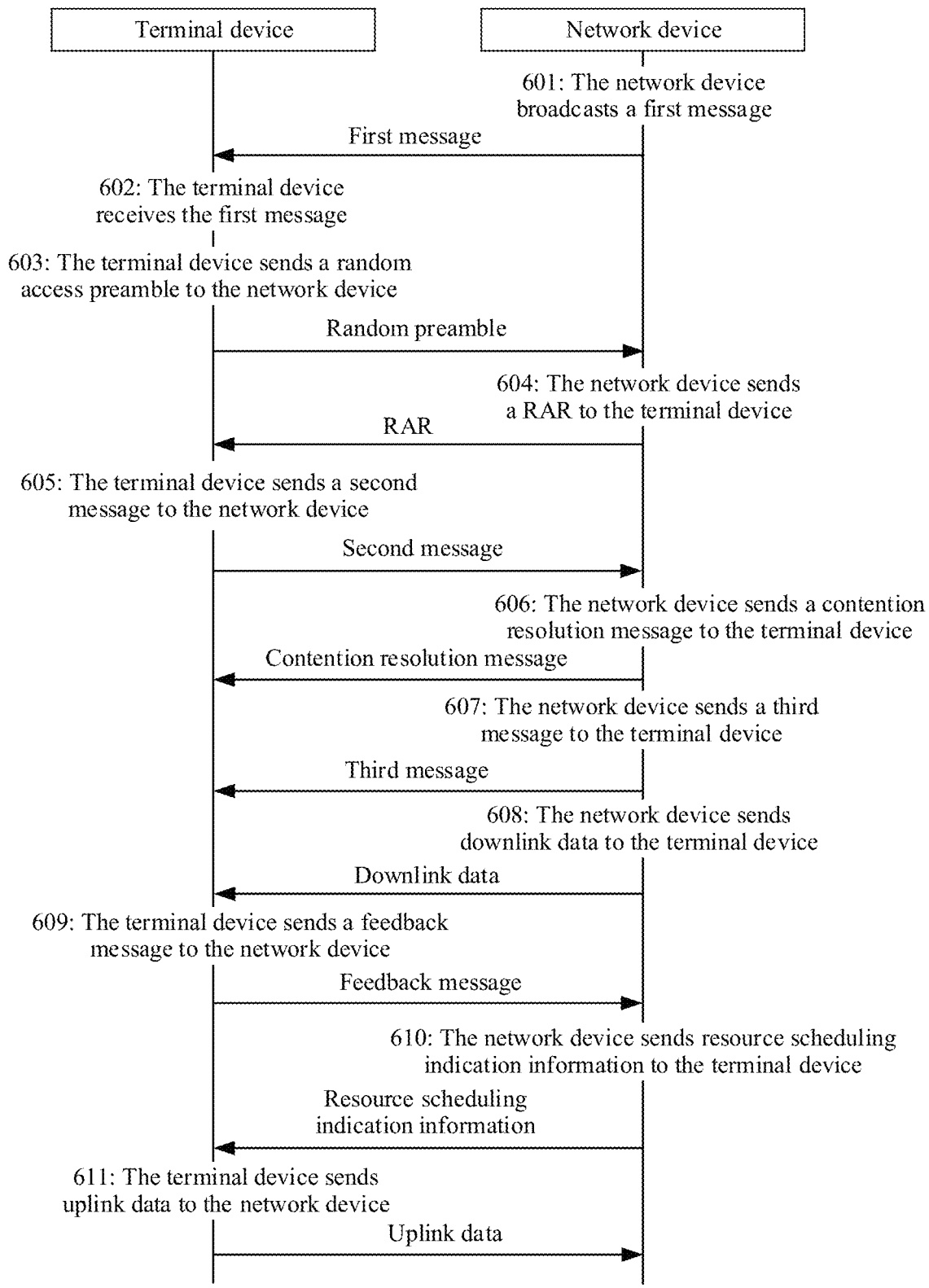
FIG. 6 is a schematic diagram of communication according to an embodiment of this application.

With reference to the foregoing descriptions, FIG. 6 is a schematic diagram of a random access process according to an embodiment of this application.

In the process shown in FIG. 6, the contention-based random access process is used as an example for description. For another case, refer to the descriptions herein.

Step 601: The network device broadcasts a first message.

The first message includes first offset information and second offset information.

Step 602: The terminal device receives the first message.

In this case, the terminal device is in an idle mode, and has not established a wireless connection to the network device. The terminal device may obtain the first offset information and the second offset information by using the first message.

When the network side pages the terminal device, or the terminal device needs to send uplink data to the network side, the terminal device needs to first establish the wireless connection to the network device through the random access process.

Step 603: The terminal device sends a random access preamble to the network device, to initiate the random access process.

Step 604: The network device sends a RAR to the terminal device.

Step 605: The terminal device determines, based on the first offset information, a start time of a RAR monitoring window for monitoring the RAR, and sends a second message to the network device after detecting the RAR in the RAR monitoring window.

As described above, the second message is a feedback message sent by the terminal device to the network device based on the RAR.

A time of sending the second message by the terminal device is determined based on the second offset information. For a specific determining method, refer to the foregoing descriptions. Details are not described herein again.

Step 606: The network device sends a contention resolution message to the terminal device.

The terminal device accesses the network device through step 601 to step 606, to receive downlink data from the network side and send the uplink data to the network side.

Optionally, the process further includes: Step 607: The network device sends a third message to the terminal device.

The third message may include third offset information and fourth offset information.

It should be noted that the network device may alternatively send the third offset information and the fourth offset information by using the first message.

Step 608: The network device sends the downlink data to the terminal device.

Step 609: The terminal device determines, based on a time offset value indicated by the third offset information, a time of sending a feedback message of the downlink data, and sends the feedback message in the corresponding time.

Step 610: The network device sends resource scheduling indication information to the terminal device.

Step 611: The terminal device determines, based on a time offset value indicated by the fourth offset information, a time of sending the uplink data on a resource indicated by the resource scheduling indication information, and sends the uplink data in the corresponding time.

In another embodiment of this application, the network device may alternatively directly indicate a time-domain time interval between the random access preamble and the start time of the RAR monitoring window, a time-domain time interval between the RAR and the second message, or the like. Therefore, the terminal device can directly determine the start time of the RAR monitoring window, send the second message, and so on based on the time intervals indicated by the network device. Compared with the previous embodiment, this embodiment does not require the terminal device to perform calculation based on various offset values, and the terminal device may directly find, based on the intervals indicated by the network device, the start time of the RAR monitoring window and the time of sending the second message. The following describes the foregoing process in detail.

Figure 7:
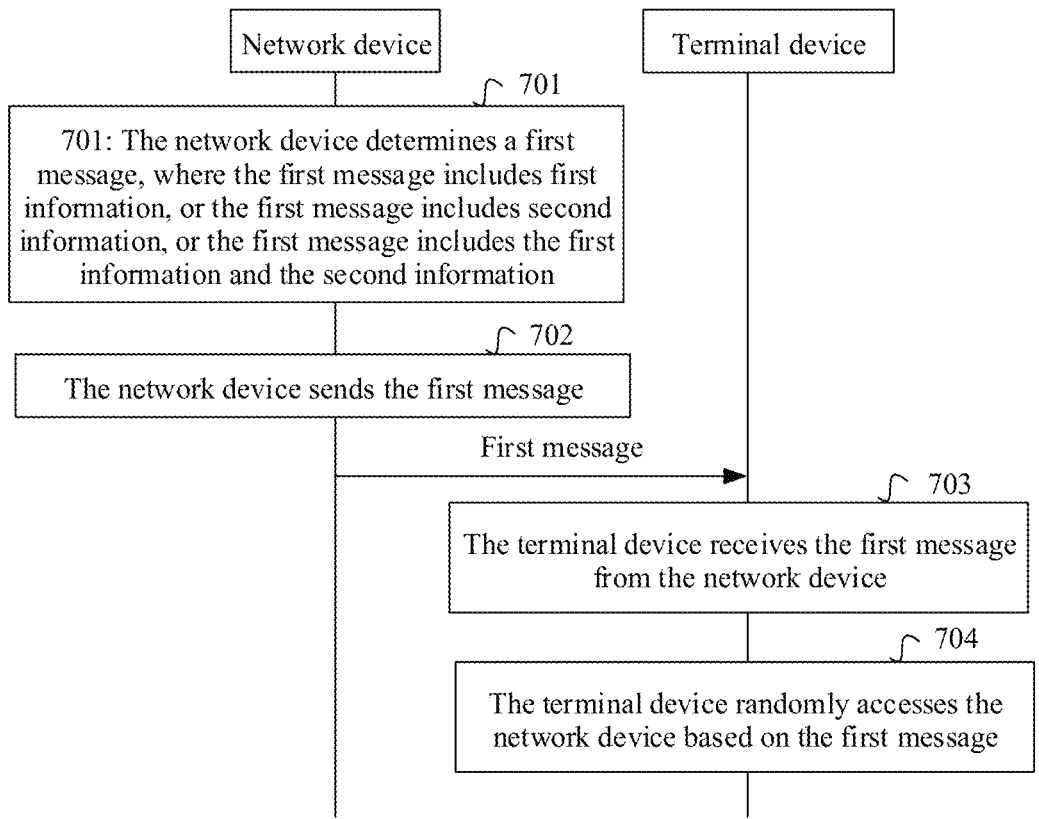
FIG. 7 is a schematic diagram of communication according to an embodiment of this application.

Specifically, FIG. 7 is a schematic flowchart of a communication method according to an embodiment of this application.

Step 701: A network device determines a first message, where the first message includes first information, or the first message includes second information, or the first message includes the first information and the second information.

The first information is used to indicate a time length of an interval between a random access request and a RAR monitoring window for a RAR corresponding to the random access request; and the second information is used to indicate a time length of an interval between the RAR and a second message, and the second message is a message sent by a terminal device based on the RAR.

The time length indicated by the first information is longer than a first time interval, and the first time interval is a time-domain interval that is configured in a 3GPP protocol and that is between the random access request and a start time of the RAR monitoring window for the RAR corresponding to the random access request. The time length indicated by the second information is longer than a second time interval, and the second time interval is a time-domain interval that is configured in a communications system and that is between the RAR and the message sent by the terminal device based on the RAR. The communications system may be a system such as an LTE system or an NR system.

Step 702: The network device sends the first message.

Step 703: The terminal device receives the first message from the network device.

Step 704: The terminal device randomly accesses the network device based on the first message.

In step 701, the random access request may be a random access preamble, and the terminal device requests random access by sending the random access preamble, to initiate the random access.

The first message may be a remaining minimum system message RMSI, or may be a SIB 1. A name of the first message is not limited in this embodiment of this application, and examples are not described one by one herein.

The time length indicated by the first information and the time length indicated by the second information may be determined based on signal transmission duration between the network device and the terminal device. For example, the time length L1 indicated by the first information may satisfy the following formula:

$$L1=\alpha \times \lceil T1 \rceil + T2 \quad (3)$$

α is a number greater than 0, T1 is the signal transmission duration between the network device and the terminal device, T2 is the first time interval, and ⌈ ⌉ represents a rounding-up operation.

Correspondingly, the time length L2 indicated by the second information may satisfy the following formula:

$$L2=\beta \times \lceil T1 \rceil + T3 \quad (4)$$

β is a number greater than 0, and T3 is the second time interval.

For example, the first time interval is 4 ms, the second time interval is 6 ms, and a distance between the network device and the terminal device is 1600 kilometers. In this case, the signal transmission duration between the network device and the terminal device is 5.28 ms, and the network device may set the time length indicated by the first information to 6 ms, and set the time length indicated by the second information to 10 ms. Certainly, the foregoing is merely an example, and the time length indicated by the first information and the time length indicated by the second information may alternatively be determined in another manner. Details are not described herein.

In this embodiment of this application, the first information and the second information may be applied to the random access process. In step 504, in the random access process, after sending the random access request, the terminal device uses, as the start time of the RAR monitoring window, a time point whose distance from the last symbol on which the terminal device sends the random access request is the time length indicated by the first information. The terminal device can accurately determine the start time of the RAR monitoring window by using the first information, to monitor the RAR in the RAR monitoring window. This resolves a problem that the terminal device cannot access the network device because the terminal device cannot detect the RAR in the RAR monitoring window due to a relatively high transmission delay of the RAR that is caused by an excessively large distance between the terminal device and the network device.

Correspondingly, after receiving the RAR, the terminal device sends the second message in a transmission time unit whose distance from a transmission time unit in which the RAR is located is the time length indicated by the second information. The second information is used to indicate a time interval between the RAR received by the terminal device and the second message, to resolve a problem that because of a timing advance mechanism, a time of sending the second message is earlier than a time of receiving the RAR by the terminal device, so that the timing advance mechanism can be applied to a long-distance transmission and high delay scenario.

Optionally, in this embodiment of this application, the first information and the second information may correspond to a same indicator bit in the first message. One indicator bit may include at least one bit, and the at least one bit may be located in one field. In this case, the first information and the second information are together configured in the first message, and correspond to a same field.

In the foregoing method, the first information and the second information correspond to the same indicator bit in the first message, and one indicator bit may be used to indicate two pieces of information, thereby reducing resource overheads of the first message, and improving system resource utilization.

Optionally, in this embodiment of this application, the first information and the second information may correspond to different indicator bits in the first message. In this case, the first information and the second information are independently configured in the first message, and respectively correspond to different fields.

In the foregoing method, the first information and the second information are independently configured in the first message separately, so that flexibility of configuring the first information and the second information can be improved, and different values are configured for the first information and the second information in different scenarios.

Optionally, in this embodiment of this application, the first message may further include at least one of third information and fourth information. The third information is used to indicate a time length of an interval between downlink data and a feedback message sent based on the downlink data. The fourth information is used to indicate a time length of an interval between resource scheduling indication information and uplink data sent on a resource indicated by the resource scheduling indication information.

The interval indicated by the third information is longer than a third time interval, and the third time interval is a time-domain interval that is configured in the communications system and that is between the downlink data and the feedback message corresponding to the downlink data. The interval indicated by the fourth information is longer than a fourth time interval, and the fourth time interval is a time-domain interval that is configured in the communications system and that is between the resource scheduling indication information and the uplink data sent based on the resource indicated by the resource scheduling indication information.

The third information and the fourth information may be applied to a process in which data transmission is performed between the terminal device and the network device after the terminal device randomly accesses the network device. Specifically, after receiving the downlink data sent by the network device, the terminal device sends the feedback message of the downlink data to the network device after waiting for the interval indicated by the third information. The feedback message may be a HARQ feedback. In this embodiment of this application, the third information is used to resolve a problem that because of the timing advance mechanism, a time of sending the feedback message by the terminal device is earlier than a time of receiving the downlink data by the terminal device.

Correspondingly, after receiving the resource scheduling indication information sent by the network device, the terminal device sends, after waiting for the interval indicated by the fourth information, the uplink data on the resource indicated by the resource scheduling indication information. In this embodiment of this application, the fourth information is used to resolve a problem that because of the timing advance mechanism, a time of sending the uplink data by the terminal device is earlier than a time of receiving the resource scheduling indication information by the terminal device.

Optionally, in this embodiment of this application, the third information and the fourth information may correspond to a same indicator bit in the first message. In this case, the third information and the fourth information are together configured in the first message, and correspond to a same field.

Optionally, in this embodiment of this application, the third information and the fourth information may correspond to different indicator bits in the first message. In this case, the third information and the fourth information are independently configured in the first message, and respectively correspond to different fields.

Optionally, when the first message includes the first information to the fourth information, the first information to the fourth information may alternatively correspond to a same indicator bit. In this case, the first information to the fourth information are together configured in the first message, and correspond to a same field. Alternatively, when the first message includes the first information to the fourth information, the first information corresponds to one indicator bit in the first message, the second information and the fourth information correspond to a same indicator bit in the first message, and the third information corresponds to another indicator bit. In this case, the first information corresponds to one field in the first message, the second information and the fourth information are together configured in the first message and correspond to a same field, and the third information corresponds to another field in the first message.

Certainly, the foregoing is merely examples. When the first message includes the first information to the fourth information, the first information to the fourth information may alternatively be implemented in another manner. Details are not described herein.

It should be noted that, in this embodiment of this application, one or more of the third information and the fourth information may alternatively be sent by using a third message. The third message may be OSI, DCI, an RRC message, or the like. This is not limited in this embodiment of this application.

Figure 8:
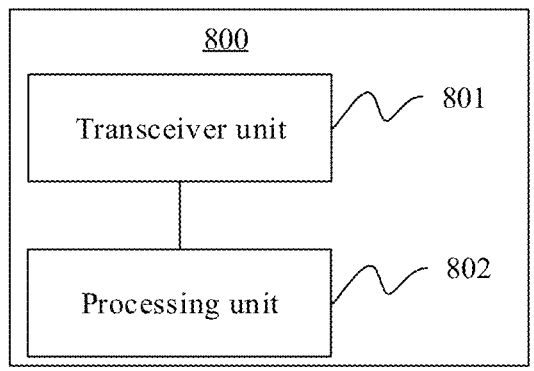
FIG. 8 is a schematic structural diagram of a communications apparatus according to an embodiment of this application.

FIG. 8 is a schematic structural diagram of a communications apparatus according to an embodiment of this application. The communications apparatus may be configured to perform actions of the terminal device or the network device in the foregoing method embodiments. The communications apparatus 800 includes a transceiver unit 801 and a processing unit 802.

When the communications apparatus 800 performs the actions of the terminal device, the transceiver unit 801 and the processing unit 802 respectively perform the following steps:

The transceiver unit 801 is configured to receive a first message from a network device, where the first message includes first offset information, or the first message includes second offset information, or the first message includes the first offset information and the second offset information; the first offset information is used to indicate a time offset value of a random access response RAR monitoring window for monitoring a RAR; and the second offset information is used to indicate a time offset value for sending a second message, and the second message is a message sent by the terminal device based on the RAR.

The processing unit 802 is configured to randomly access the network device based on the first message.

In an optional implementation, the first offset information and the second offset information correspond to a same indicator bit in the first message.

In an optional implementation, the first message further includes third offset information, and the third offset information is used to indicate a time offset value for sending a feedback message of downlink data by the terminal device.

In an optional implementation, the first message further includes fourth offset information, and the fourth offset information is used to indicate a time offset value for sending uplink data.

In an optional implementation, the third offset information and the fourth offset information correspond to a same indicator bit in the first message.

In this embodiment of this application, when the communications apparatus 800 performs the actions of the network device, the transceiver unit 801 and the processing unit 802 respectively perform the following steps:

The processing unit 802 is configured to determine a first message, where the first message includes first offset information, or the first message includes second offset information, or the first message includes the first offset information and the second offset information; the first offset information is used to indicate a time offset value of a random access response RAR monitoring window for monitoring a RAR; and the second offset information is used to indicate a time offset value for sending a second message, and the second message is a message sent by a terminal device based on the RAR.

The transceiver unit 801 is configured to send the first message.

In an optional implementation, the first offset information and the second offset information correspond to a same indicator bit in the first message.

In an optional implementation, the first message further includes third offset information, and the third offset information is used to indicate a time offset value for sending a feedback message of downlink data by the terminal device.

In an optional implementation, the first message further includes fourth offset information, and the fourth offset information is used to indicate a time offset value for sending uplink data.

In an optional implementation, the third offset information and the fourth offset information correspond to a same indicator bit in the first message.

In an optional implementation, the transceiver unit 801 is further configured to:
send a third message to the terminal device, where the third message includes third offset information, or the third message includes fourth offset information, or the third message includes the third offset information and the fourth offset information.

The third offset information is used to indicate a time offset value for sending a feedback message of downlink data by the terminal device, and the fourth offset information is used to indicate a time offset value for sending uplink data.

Figure 3:
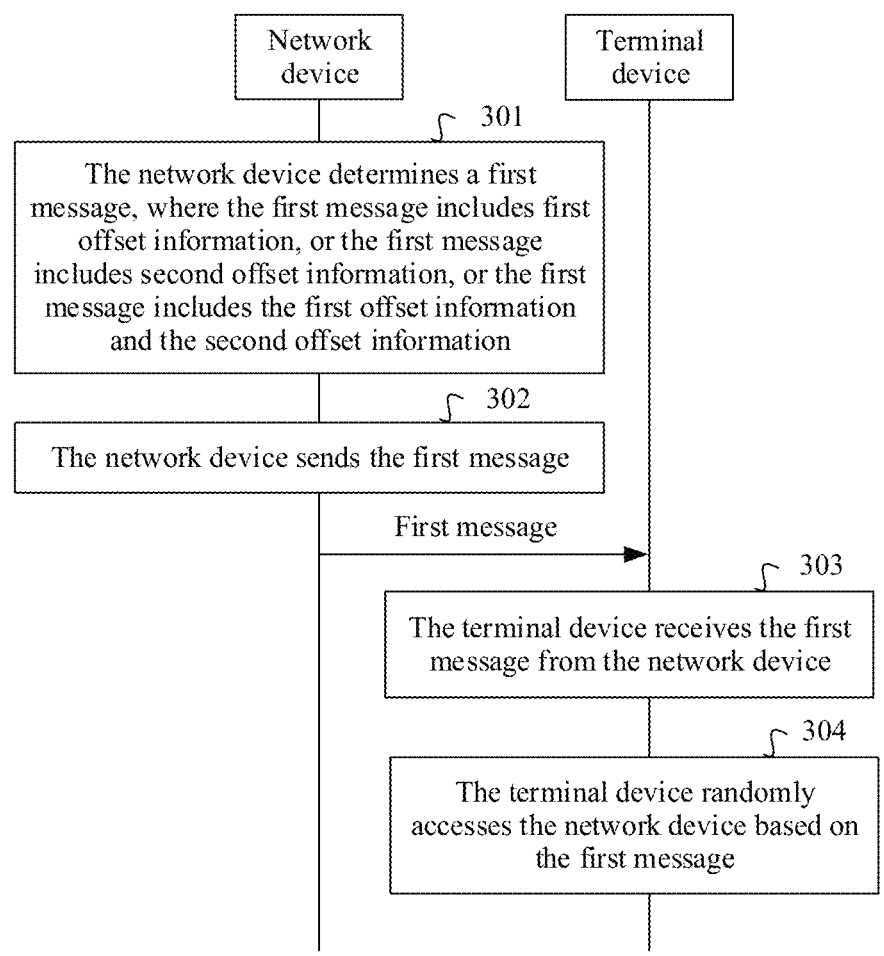
FIG. 3 is a system schematic diagram of a communication method according to an embodiment of this application.
Figure 9:
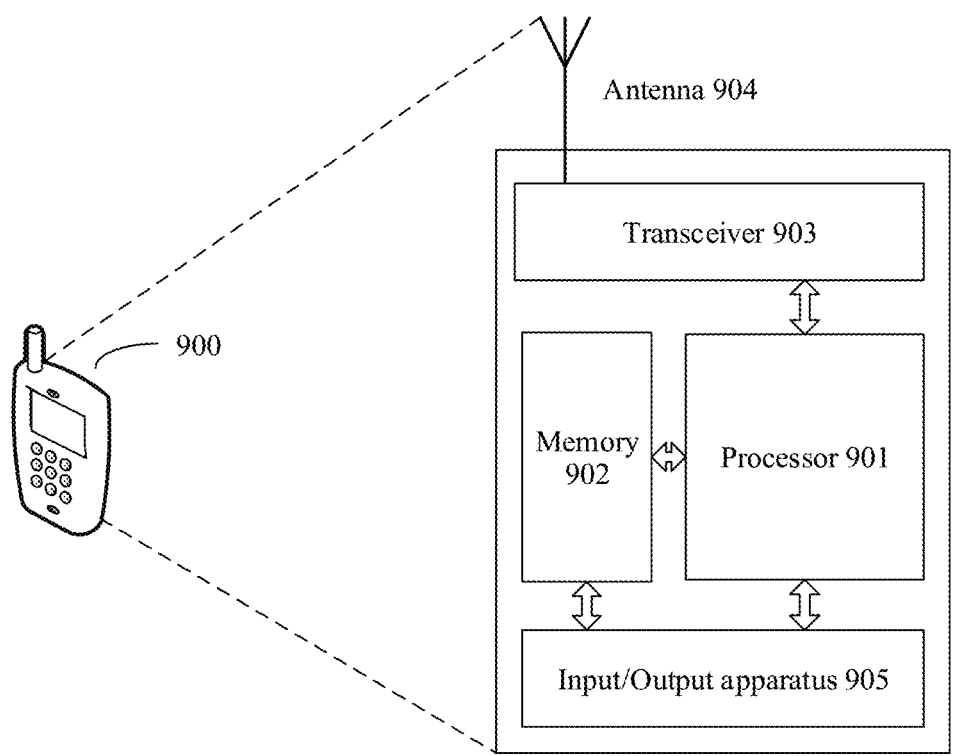
FIG. 9 is a schematic structural diagram of a communications apparatus according to an embodiment of this application.

FIG. 9 is a schematic structural diagram of a communications apparatus according to an embodiment of this application. The communications apparatus shown in FIG. 9 may be an implementation of a hardware circuit of the communications apparatus shown in FIG. 8. The communications apparatus is applicable to the flowchart shown in FIG. 3 or FIG. 6, and performs functions of the terminal device in the foregoing method embodiments. For ease of description, FIG. 9 shows only main components of the communications apparatus. As shown in FIG. 9, the communications apparatus 900 includes a processor 901, a memory 902, a transceiver 903, an antenna 904, and an input/output apparatus 905. The processor 901 is mainly configured to: process a communication protocol and communication data, control the entire wireless communications apparatus, execute a software program, and process data of the software program. For example, the processor 901 is configured to support the wireless communications apparatus in performing the actions described in the foregoing method embodiments. The memory 902 is mainly configured to store the software program and the data. The transceiver 903 is mainly configured to: perform conversion between a baseband signal and a radio frequency signal, and process the radio frequency signal. The antenna 904 is mainly configured to send and receive a radio frequency signal in a form of an electromagnetic wave. The input/output apparatus 905, such as a touchscreen, a display screen, or a keyboard, is mainly configured to receive data entered by a user and output data to the user.

When the communications apparatus 900 is powered on, the transceiver 903 is configured to receive a first message from a network device, where the first message includes first offset information, or the first message includes second offset information, or the first message includes the first offset information and the second offset information; the first offset information is used to indicate a time offset value of a random access response RAR monitoring window for monitoring a RAR; and the second offset information is used to indicate a time offset value for sending a second message, and the second message is a message sent by the terminal device based on the RAR.

The processor 901 is configured to randomly access the network device based on the first message.

In an optional implementation, the first offset information and the second offset information correspond to a same indicator bit in the first message.

In an optional implementation, the first message further includes third offset information, and the third offset information is used to indicate a time offset value for sending a feedback message of downlink data by the terminal device.

In an optional implementation, the first message further includes fourth offset information, and the fourth offset information is used to indicate a time offset value for sending uplink data.

In an optional implementation, the third offset information and the fourth offset information correspond to a same indicator bit in the first message.

Figure 10:
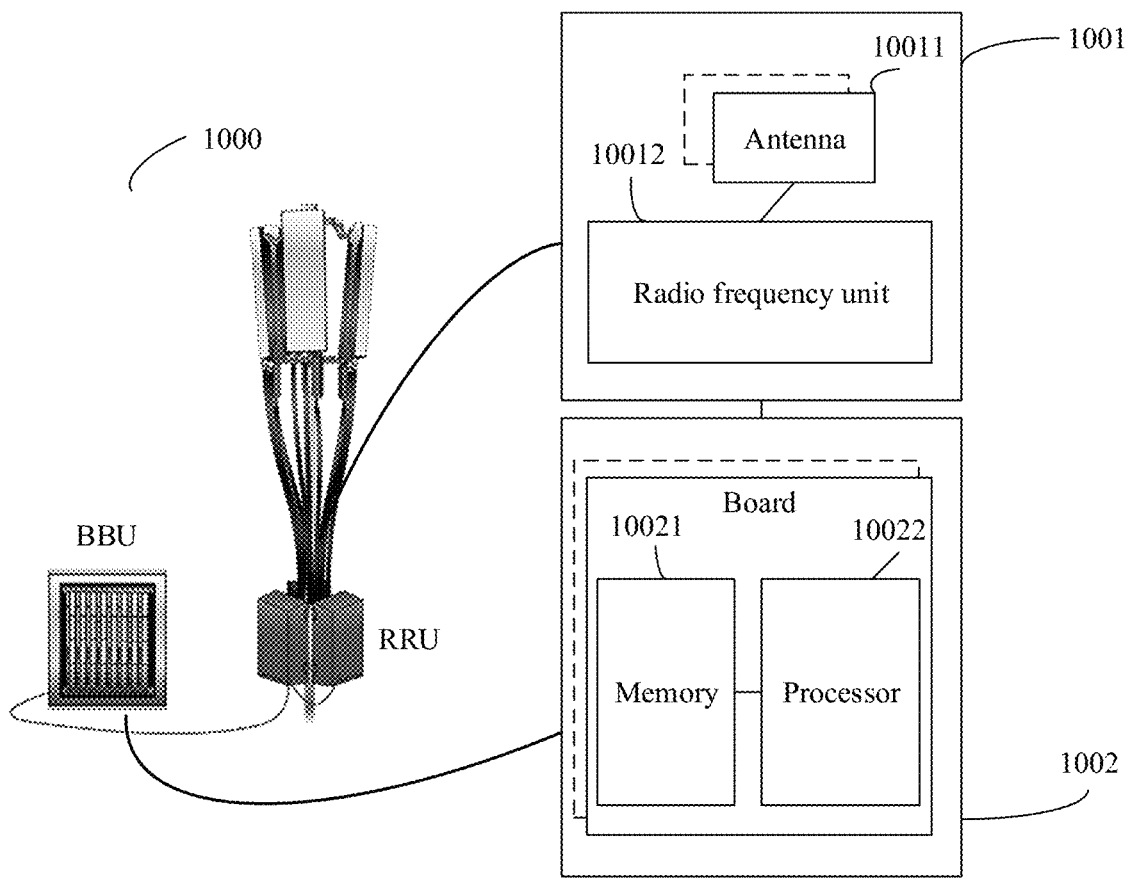
FIG. 10 is a schematic structural diagram of a network device according to an embodiment of this application.

FIG. 10 is a schematic structural diagram of a network device. The network device may be applied to the method shown in FIG. 3. The network device 1000 includes one or more remote radio units (RRU) 1001 and one or more baseband units (BBU) 1002. The RRU 1001 may be referred to as a transceiver unit, a transceiver, a transceiver circuit, a transceiver, or the like, and may include at least one antenna 10011 and a radio frequency unit 10012. The RRU 1001 is mainly configured to: send and receive a radio frequency signal, and perform conversion between the radio frequency signal and a baseband signal, for example, configured to send the signaling indication or the reference signal in the foregoing embodiments to a terminal. The BBU 1002 is mainly configured to: perform baseband processing, control the network device, and so on. The RRU 1001 and the BBU 1002 may be physically disposed together, or may be physically separated, namely, in a distributed base station.

The BBU 1002 is a control center of the network device, may be referred to as a processing unit, and is mainly configured to complete baseband processing functions such as channel coding, multiplexing, modulation, and spectrum spreading. In an example, the BBU 1002 may include one or more boards, and a plurality of boards may jointly support a radio access network (such as a 5G network) in a single access standard, or may respectively support radio access networks in different access standards. The BBU 1002 further includes a memory 10021 and a processor 10022. The memory 10021 is configured to store a necessary instruction and necessary data. The processor 10022 is configured to control the network device to perform a necessary action. The memory 10021 and the processor 10022 may serve one or more boards. In other words, a memory and a processor may be disposed on each board. Alternatively, a plurality of boards may share a same memory and processor. In addition, a necessary circuit is further disposed on each board.

The network device may be configured to implement the methods in the foregoing method embodiments, and details are as follows:

The processor 10022 is configured to determine a first message, where the first message includes first offset information, or the first message includes second offset information, or the first message includes the first offset information and the second offset information; the first offset information is used to indicate a time offset value of a random access response RAR monitoring window for monitoring a RAR; and the second offset information is used to indicate a time offset value for sending a second message, and the second message is a message sent by a terminal device based on the RAR.

The RRU 1001 is configured to send the first message.

In an optional implementation, the first offset information and the second offset information correspond to a same indicator bit in the first message.

In an optional implementation, the first message further includes third offset information, and the third offset information is used to indicate a time offset value for sending a feedback message of downlink data by the terminal device.

In an optional implementation, the first message further includes fourth offset information, and the fourth offset information is used to indicate a time offset value for sending uplink data.

In an optional implementation, the third offset information and the fourth offset information correspond to a same indicator bit in the first message.

In an optional implementation, the RRU 1001 is further configured to:

send a third message to the terminal device, where the third message includes third offset information, or the third message includes fourth offset information, or the third message includes the third offset information and the fourth offset information.

The third offset information is used to indicate a time offset value for sending a feedback message of downlink data by the terminal device, and the fourth offset information is used to indicate a time offset value for sending uplink data.

It is clear that a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A communication method, comprising:
   receiving a first message, wherein the first message comprises first offset information indicating a time offset value of a random access response (RAR) monitoring window for monitoring a RAR, wherein the first message is a broadcast message and the first message comprises a parameter for determining a second time offset value for sending an uplink message by a terminal device based on the RAR;
   sending, to a network device, a random access request;
   starting to monitor from a second start time of the RAR monitoring window after a first time interval plus the time offset value of the RAR monitoring window, the RAR from the network device, and wherein the first time interval is a time-domain interval between the random access request and a first start time of the RAR monitoring window, and the time offset value of the RAR monitoring window>0;
   sending the uplink message based on the RAR after a second time interval plus the second time offset value for sending the uplink message at a second time of the uplink message; wherein the time offset value for sending the uplink message is greater than zero, and the second time interval is a time-domain interval between the RAR and a first time of the uplink message; and
   sending a feedback message of downlink data at a third sending time, wherein the downlink data is received at a third receiving time, a third time duration between the third sending time and the third receiving time is a sum of a third time interval and a time offset value for sending the feedback message of the downlink data, wherein the third time interval is configured based on a 3rd generation partnership project (3GPP) protocol.

2. The method according to claim 1, wherein the first offset information corresponds to an indicator bit in the first message.

3. The method according to claim 1, wherein the first message further comprises fourth offset information, and the fourth offset information indicates a time offset value for sending uplink data.

4. The method according to claim 3, wherein the first message further comprises third offset information, the third offset information indicates the time offset value for sending the feedback message of the downlink data by the terminal device, and the third offset information and the fourth offset information correspond to a same indicator bit in the first message.

5. A communications apparatus, comprising: at least one processor and a memory having instructions, wherein the instructions are executed by the at least one processor to cause the apparatus to:
   receive a first message, wherein the first message comprises first offset information indicating a time offset value of a random access response (RAR) monitoring window for monitoring a RAR, wherein the first message is a broadcast message and the first message comprises a parameter for determining a second time offset value for sending an uplink message by the apparatus based on the RAR;
   send to a network device, a random access request;
   start to monitor from a second start time of the RAR monitoring window after a first time interval plus the time offset value of the RAR monitoring window, the RAR from the network device, and wherein the first time interval is a time-domain interval between the random access request and a first start time of the RAR monitoring window, and the time offset value of the RAR monitoring window>0;
   send the uplink message based on the RAR after a second time interval plus the second time offset value for sending the uplink message at a second time of the uplink message; wherein the time offset value for sending the uplink message is greater than zero, and the second time interval is a time-domain interval between the RAR and a first time of the uplink message; and
   send a feedback message of downlink data at a third sending time, wherein the downlink data is received at a third receiving time, a third time duration between the third sending time and the third receiving time is a sum of a third time interval and a time offset value for sending a feedback message of downlink data, wherein the third time interval is configured based on a 3rd generation partnership project (3GPP) protocol.

6. The apparatus according to claim 5, wherein the first offset information corresponds to an indicator bit in the first message.

7. The apparatus according to claim 5, wherein the first message further comprises fourth offset information, and the fourth offset information indicates a time offset value for sending uplink data.

8. The apparatus according to claim 7, wherein the first message further comprises third offset information, the third offset information indicates the time offset value for sending the feedback message of the downlink data by the apparatus, and the third offset information and the fourth offset information correspond to a same indicator bit in the first message.

9. A communications apparatus, comprising: at least one processor and a memory having instructions, wherein the instructions are executed by the at least one processor to cause the apparatus to:
send to a terminal device a first message comprising first offset information, wherein the first offset information indicates a time offset value of a random access response (RAR) monitoring window for monitoring a RAR, wherein the first message is a broadcast message and the first message comprises a parameter for determining a second time offset value for sending an uplink message by the terminal device based on the RAR;
receive from the terminal device, a random access request;
send to the terminal device, the RAR based on a second starting time of the RAR monitoring window time after a first time interval plus the time offset value of the RAR monitoring window, and wherein the first time interval is a time-domain interval between the random access request and a first start time of the RAR monitoring window, and the time offset value of the RAR monitoring window>0;
receive the uplink message based on the RAR and after a second time interval plus the second time offset value for sending the uplink message at a second time of the uplink message, wherein the time offset value for sending the uplink message is greater than zero, and the second time interval is a time-domain interval between the RAR and a first time of the uplink message; and
receive a feedback message of downlink data at a third sending time, wherein the downlink data is sent at a third receiving time, a third time duration between the third sending time and the third receiving time is a sum of a third time interval and a time offset value for sending a feedback message of downlink data, wherein the third time interval is configured based on a 3rd generation partnership project (3GPP) protocol.

10. The apparatus according to claim 9, wherein the first offset information corresponds to an indicator bit in the first message.

11. The apparatus according to claim 9, wherein the first message further comprises fourth offset information, and the fourth offset information indicates a time offset value for sending uplink data.

12. The apparatus according to claim 11, wherein the first message further comprises third offset information, the third offset information indicates the time offset value for sending the feedback message of the downlink data by the terminal device, and the third offset information and the fourth offset information correspond to a same indicator bit in the first message.

13. The apparatus according to claim 11, wherein the instructions are executed by the at least one processor to further cause the apparatus to:
send a third message to the terminal device, wherein the third message comprises third offset information, or the third message comprises fourth offset information, or the third message comprises the third offset information and the fourth offset information, wherein
the third offset information indicates a time offset value for sending a feedback message of downlink data by the terminal device, and the fourth offset information indicates a time offset value for sending uplink data.

* * * * *